United States Patent Office 3,351,640
Patented Nov. 7, 1967

3,351,640
4,8,14-TRIMETHYL-18-NOR-8α,9β,14β-ANDROST-4-ENE-3,17-DIONE
Patrick A. Diassi, Westfield, and Pacifico A. Principe, South River, N.J., assignors to E. R. Squibb & Sons, Inc., New York, N.Y., a corporation of Delaware
No Drawing. Filed Mar. 23, 1966, Ser. No. 536,623
3 Claims. (Cl. 260—397.3)

This invention relates to and has for its object the provision of new physiologically active compounds, having the formula

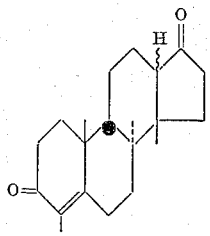

The novel compounds of this invention are pharmacologically active substances which possess anti-androgenic activity (i.e., they inhibit the actions of androgens), and which may be used in the treatment of such conditions as hyperandrogenic acne. They also possess anti-estrogenic and androgenic activity.

The compounds may be formulated for such administration, the concentration and/or dosage being based on the activity of the particular compound and the requirements of the patient.

The final product of this invention is prepared by the process of this invention which entails beginning with 4α,8,14-trimethyl-18-nor - 5α,8α,9β,14β-androstane-3,17-dione and 4α,8,14 - trimethyl-18-nor-5α,8α,9β,13α,14β-androstane-3,17-dione as starting material. The preparation of these compounds is disclosed in copending U.S. patent application, Ser. No. 406,877, filed October 27, 1964. It has been found that the compounds of this invention can be prepared from the starting material by subjecting the latter to the action of a microorganism of the genus Pseudomonas or to the action of the enzymes thereof under oxidizing and preferably aerobic conditions.

To prepare the compounds of this invention, the starting material may be first subjected to the action of enzymes of a microorganism of the genus Pseudomonas under oxidizing conditions. This oxidation can best be effected either by including the starting material in an aerobic culture of the microorganism, or by bringing together in an aqueous medium, the compounds, air, and enzymes of nonproliferating cells of the microorganism.

In general, the conditions of culturing the Pseudomonas microorganism for the purposes of this invention are (except for the inclusion of the starting material to be converted), the same as those of culturing various other microorganisms. As, for example, for the production of antibiotics and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

The microbial process described hereinabove yields 4,8,14-trimethyl-18-nor-8α,9β,14β-androst - 4 - ene-3,17-dione and 4,8,14-trimethyl-18-nor-8α,9β,13α,14β-androst-4-ene-3,17-dione.

The invention may be illustrated by the following examples, all temperatures are in degrees centigrade unless otherwise stated:

EXAMPLE 1

*4,8,14-trimethyl-18-nor-8α,9β,14β-androst-4-ene-3,17-dione*

Surface growth from each of four two-week-old agar slants of *Pseudomonas testosteroni* ATCC (American Type Culture Collection) No. 11996, the slants containing as a nutrient medium (A):

| | Grams |
|---|---|
| Glucose | 10 |
| Yeast extract | 2.5 |
| K₂HPO₄ | 1 |
| Agar | 20 |
| Distilled water to 1 liter. | | is suspended in 5 ml. of 0.01% aqueous sodium lauryl sulfate solution. One ml. portions of this suspension are used to inoculate sixteen 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After eighteen hours incubatiton at 25° C. with continuous rotary agitation (280 cycles/minute; two-inch radius), 5% (v.:v.) transfers are made to one hundred 250 ml. Erlenmeyer flasks, each containing 50 ml. of freshly sterilized medium B. After twenty-four hours of further incubation, using the same conditions described above, each flask is supplemented with 200 micrograms/ml. of 4α,8,14 - trimethyl - 18-nor-5α,8α,9β,14β - androstane-3,17-dione. The steroid is added by supplementing each flask with 0.25 ml. of a sterile solution (40 mg./ml.) of the steroid in N,N-dimethylformamide. A total of 1.0 gm. is fermented. After six days of further incubation, using the same conditions as described above, the contents of the flasks are pooled and the broth is then adjusted to pH 4.0 using 12 N H₂SO₄. The acidified broth is then filtered through a Seitz clarifying pad. The flasks mycelium and pad are washed with successive 50 ml. portions of warm water. The combined filtrate and washings have a volume of 5700 ml. They are extracted three times with 1900 ml. portions of chloroform which are combined, washed twice with 2 liter portions of water and evaporated, in vacuo. The residue is plate chromatographed on Woelm neutral alumina (Activity V) using chloroform as the developing solvent. The band at Rf≈0.5 is eluted with ethyl acetate, evaporate and crystallized from acetone-hexane to give 4,8,14-trimethyl-18 - nor - 8α,9β,14β - androst-4-ene-3,17 - dione having a melting point about 210–212° C., $[\alpha]_D^{22}+254°$ (chloroform), $\lambda_{max.}^{alc.}$ 254 m$\mu$ ($\epsilon$, 14,400), $\substack{CCl_4 \\ max.}$ 1743, 1668, 1621 cm.$^{-1}$, $\tau_{CDCl_3}^{SiMe_4}$ 8.26 (s., 4-CH$_3$), 8.65 (s., CH$_3$), 8.79 (s., CH$_3$), 9.27 (s., CH$_3$)

*Analysis.*—Calc'd for C$_{21}$H$_{30}$O$_2$ (314.45): C, 80.21; H, 9.62. Found: C, 80.39; H, 9.47.

EXAMPLE 2

*4,8,14-trimethyl-18-nor-8α,9β,13α,14β-androst-4-ene-3,17-dione*

Following the procedure of Example 1 but substituting 4α,8,14 - trimethyl-18-nor-5α,8α,9β,13α,14β - androstane-3,17-dione for the 4α,8,14-trimethyl-18-nor-5α,8α,9β,14β-androstane-3,17-dione there is obtained 4,8,14-trimethyl-18-nor-8α,9β,13α,14β-androst-4-ene-3,17-dione.

The invention may be variously otherwise embodied within the scope of the appended claims.

What is claimed is:
1. A compound having the formula

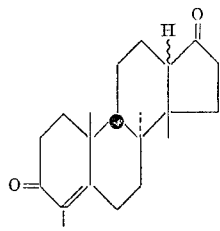

2. A compound in accordance with claim 1 having the name 4,8,14-trimethyl - 18 - nor-8α,9β,14β-androst-4-ene-3,17-dione.
3. A compound in accordance with claim 1 having the name 4,8,14-trimethyl-18-nor-8α,9β,13α,14β-androst-4-ene-3,17-dione.

References Cited

UNITED STATES PATENTS 3,274,219   9/1966   Krakower _____ 260—397.45

OTHER REFERENCES

Comptes Rendus, vol. 258, pages 3491 to 3494 (Apr. 1, 1964).

Experientia, vol. 20 (1964), pages 344 to 347.

ELBERT L. ROBERTS, *Primary Examiner.*